(12) United States Patent
Conrad et al.

(10) Patent No.: US 10,612,556 B2
(45) Date of Patent: Apr. 7, 2020

(54) BLADE OF AN AIR-CONVEYING WHEEL WITH AN S-SHAPED BLADE EDGE GEOMETRY

(71) Applicant: ebm-papst Mulfingen GmbH & Co. KG, Mulfingen (DE)

(72) Inventors: Daniel Conrad, Langenbrettach (DE); Christian Pfaff, Künzelsau (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 8 days.

(21) Appl. No.: 16/056,708

(22) Filed: Aug. 7, 2018

(65) Prior Publication Data
US 2018/0340547 A1 Nov. 29, 2018

Related U.S. Application Data

(63) Continuation of application No. PCT/EP2017/059425, filed on Apr. 20, 2017.

(30) Foreign Application Priority Data

Apr. 25, 2016 (DE) .......................... 10 2016 107 656

(51) Int. Cl.
*F04D 29/30* (2006.01)
*H02K 9/06* (2006.01)
(Continued)

(52) U.S. Cl.
CPC ......... *F04D 29/30* (2013.01); *F04D 25/0606* (2013.01); *F04D 25/082* (2013.01);
(Continued)

(58) Field of Classification Search
None
See application file for complete search history.

(56) References Cited

U.S. PATENT DOCUMENTS 2,043,736 A * 6/1936 Charavay .............. F04D 29/386
416/238
2,567,249 A * 9/1951 Stalker ..................... F02C 7/18
416/90 R
(Continued)

FOREIGN PATENT DOCUMENTS

CN 201639437 U 11/2010
DE 20 2013 102 470 U1 6/2013
EP 1 726 832 A2 11/2006

OTHER PUBLICATIONS

International Search Report for PCT/EP2017/059425, dated Jul. 18, 2017; ISA/EP.
(Continued)

*Primary Examiner* — Michael Lebentritt
(74) *Attorney, Agent, or Firm* — Harness, Dickey & Pierce, P.L.C.

(57) ABSTRACT

The disclosure relates to a blade edge of at least one blade of an air-conveying wheel with an axial-side blade edge contour which extends from a blade leading edge to a blade trailing edge along a curve, wherein the blade edge contour has at least one front section which adjoins the blade leading edge in the radial direction, a rear section which adjoins the blade trailing edge in the radial direction, and a central section which lies between the front section and the rear section. The blade edge contour has an S-shaped curve progression in the central section in a lateral cross-sectional view, thus increasing an axial height of the blade in the direction of the blade trailing edge.

12 Claims, 2 Drawing Sheets

(51) Int. Cl.
  *F04D 29/28* (2006.01)
  *F04D 25/06* (2006.01)
  *F04D 25/08* (2006.01)
  *H02K 5/24* (2006.01)

(52) U.S. Cl.
  CPC .............. *F04D 29/282* (2013.01); *H02K 5/24* (2013.01); *H02K 9/06* (2013.01); *F05D 2200/25* (2013.01); *F05D 2240/307* (2013.01); *F05D 2250/713* (2013.01); *F05D 2250/75* (2013.01); *H02K 2213/03* (2013.01)

(56) References Cited

U.S. PATENT DOCUMENTS

| | | | | |
|---|---|---|---|---|
| 3,333,817 | A * | 8/1967 | Rhomberg | B64C 11/18 416/242 |
| 10,415,581 | B1 * | 9/2019 | Seeley | B64C 11/18 |
| 2002/0127108 | A1 * | 9/2002 | Crall | B23K 20/129 416/213 R |
| 2004/0213661 | A1 * | 10/2004 | Sekularac | F01D 5/048 415/1 |
| 2009/0003989 | A1 * | 1/2009 | Guemmer | F01D 5/145 415/115 |
| 2009/0184601 | A1 | 7/2009 | Dubus et al. | |
| 2009/0196754 | A1 | 8/2009 | Hwang et al. | |
| 2014/0064970 | A1 * | 3/2014 | Springer | F01D 5/141 416/179 |
| 2018/0283179 | A1 * | 10/2018 | Gonzalez-Gutierrerz | B64D 27/10 |
| 2019/0136695 | A1 * | 5/2019 | Gugau | F01D 5/048 |
| 2019/0136868 | A1 * | 5/2019 | Churchill | F04D 29/386 |

OTHER PUBLICATIONS

German Search Report for corresponding Application No. DE102016107656.2, dated Aug. 29, 2017.

* cited by examiner

BLADE OF AN AIR-CONVEYING WHEEL WITH AN S-SHAPED BLADE EDGE GEOMETRY

CROSS-REFERENCE TO RELATED APPLICATIONS

This application is a continuation of International Application No. PCT/EP2017/059425, filed Apr. 20, 2017, which claims priority to German Application No. 10 2016 107 656.2, filed Apr. 25, 2016. The disclosures of the above applications are incorporating herein by reference.

FIELD

The disclosure relates to a blade edge of at least one blade of an air-conveying wheel with an axial-side blade edge contour that extends from the blade leading edge to a blade trailing edge along a predetermined curve.

BACKGROUND

In electric motors, in particular in external rotor motors, sufficient cooling on the stator bushing and the electronic unit is essential for power and a useful life. An improvement in cooling is always desirable. In the prior art, for example, DE 10 2012 107 109 A1, it is provided, for this purpose, to guide a cooling air stream specifically along components to be cooled. In practice, this works very well. However, the maximum possible cooling capacity has not yet been fully exploited. On the contrary, in addition to the guiding of the cooling air stream, adaptations of the rotor generating the cooling air stream and consequently of the air stream itself are possible. In addition, this also enables a reduction of the noise generation.

The underlying aim of the disclosure therefore is to increase the cooling capacity generated by an air-conveying wheel in an electric motor. Furthermore, the aim of the disclosure is to reduce noise generated by the air-conveying wheel.

SUMMARY

According to the disclosure, a blade edge of at least one blade of an air-conveying wheel is provided with an axial-side blade edge contour that extends from a blade leading edge to a blade trailing edge along a curve. The blade edge contour has at least one front section that adjoins the blade leading edge in the radial direction. A rear section adjoins the blade trailing edge in the radial direction. A central section lies between the front section and the rear section. The blade edge contour has an S-shaped curve progression in the central section, in a lateral cross-sectional view. Thus, this increases an axial height of the blade in the direction of the blade trailing edge.

The blades of the air-conveying wheel includes a specific geometry over the radial chord length along the axially free blade edges. This increases the suction volume flow and consequently the cooling air stream provided for cooling. The wave-shaped or S-shaped design of the central area of the blade edge contour makes an essential contribution. In an installation position of the air-conveying wheel, which adjoins the stator bushing or the stator bushing cooling ribs of an electric motor, in particular of an external rotor motor, the axially suctioned and radially blown-out cooling-air stream advantageously discharges the heat of the motor into the environment. For this purpose, a predetermined (marginal) area of the stator bushing is provided with one or more openings. The suction volume flow is suctioned through the one or more openings. Due to the low pressure generated on the portion of the stator bushing without openings, a circulation flow between the stator bushing and the air-conveying wheel occurs. Thus, the cooling effect is further increased.

Furthermore, due to the blade edge contour, the gap size of the blades relative to adjoining components, in particular relative to the stator bushing or the stator bushing cooling ribs, is variable over the radius. Thus, lower sound pressure levels are reached and interfering blade passing noise is eliminated.

In a variation of the disclosure, the stator bushing cooling ribs have, at least with regard to the axial extent, from radially inside to radially outside, a substantially complementary shape relative to the blades of the air-conveying wheel. This leads to a compact structure between the air-conveying wheel and stator bushing, when viewed in the axial direction.

In another design, the S-shaped curve progression of the blade edge contour corresponds, in the central section, to a curve of a hyperbolic tangent.

In addition, in a development of the blade edge, the blade edge contour has a continuous curve progression, at least in sections, in the front section and in the rear section. Preferably, the blade edge contour has a continuous curve progression in the front section and in the rear section over 50-100%, preferably 70-100%, and more preferably 80-100% of the radial length, i.e., the chord length.

Although it is not be ruled out that additional blade edge sections can be implemented in addition to the three described blade edge sections, in an advantageous design, the front section and the rear section directly adjoin the central section. Here, the curve of the blade edge contour is in each case continuously differentiable on both sides at the respective adjoining transition points of the front section to the central section as well as of the rear section to the central section. There are no jumps in the curve progression at the transition points between the sections.

In a calculated advantageous design, the central section has a curve progression along the chord length (s) of the blade from the beginning of the central section $s_{central\ section}^{min}$ to the end of the central section $s_{central\ section}^{max}$. It is determined normalized by the formula:

$$h(s) = \tanh\left(\frac{s - \left(\frac{s_{central\ section}^{min} + s_{central\ section}^{max}}{2}\right)}{t}\right) * \frac{h(s_{central\ section}^{min}) + h(s_{central\ section}^{max})}{2} + h(s_{central\ section}^{min}) + \frac{h(s_{central\ section}^{min}) + h(s_{central\ section}^{max})}{2}$$

h corresponds to an axial height of the blade; and
s corresponds to a chord length of the blade, that extends from the blade leading edge to the blade trailing edge,
h and s in each case have values from 0 to 1,
and $t \in [0,1]$, $0.1 \leq s_{central\ section}^{min} \leq s_{central\ section}^{max}$, $s_{central\ section}^{min} \leq s_{central\ section}^{max} \leq 0.8$.

In an advantageous embodiment, the front section has a curve progression along a chord length s of the blade. It is determined normalized by the formula $$h(s) = a \times s + d$$

h corresponds to an axial height of the blade; and
s corresponds to a chord length of the blade, that extends from the blade leading edge to the blade trailing edge from the value 0 to 1.
Furthermore $$s \in [0, s_{central\ section}^{min}] \text{ and}$$

$$-0.5 \leq a \leq 1 \text{ as well as } 0 < d \leq 1 \text{ and } a+d \leq 1.$$

In an advantageous design, the rear section has a curve progression along the chord length s of the blade. It is determined normalized by the formula $$h(s) = a \times (s - s_{central\ section}^{max}) + d$$

Furthermore, $$s \in [0, s_{central\ section}^{max}, 1] \text{ and}$$

$$-0.5 \leq a \leq 1 \text{ as well as } 0 < d \leq 1 \text{ and } a+d \leq 1,$$

s, h and d are defined as described above with regard to the front section.

In a development of the blade edge, the front section has a curve progression in a transition from an axial extent to a radial extent having a rounding r, that is determined by $0 \leq r \leq H$.

H corresponds unchanged to the axial maximum height of the blade. The rounding makes an additional contribution towards increasing of the conveyed cooling air stream.

Also advantageous is a design of the disclosure where the blade trailing edge, in an axial top view onto the blades, has an inclination with respect to a radial extent at an angle α, where 5°<α<70°, more preferably 15°<α<60°.

The disclosure moreover comprises an air-conveying wheel with at least one blade with an above-described blade edge which, in the axial direction, is open to inflow, i.e., not covered by a cover plate. Because the air-conveying wheel has no (rotationally symmetric) cover plate, the degree of turbulence of the flow between the air-conveying wheel and the adjoining component in the electric motor (for example, motor flange) is considerably increased, and consequently the heat dissipation is increased.

A use of the air-conveying wheel is also part of the disclosure. The installation position in an electric motor occurs in such a manner that a thin head gap K, adjoining the blade edge in the axial direction relative to an axially adjoining component of the electric motor, is in a range of 0.02 H<K<0.4 H. H here too corresponds to the axial maximum height of the blade.

Other advantageous developments of the disclosure are characterized and represented in further detail below together with the description of the preferred embodiment of the disclosure in reference to the figures.

DRAWINGS

The drawings described herein are for illustrative purposes only of selected embodiments and not all possible implementations, and are not intended to limit the scope of the present disclosure.

DETAILED DESCRIPTION

Figure 1:
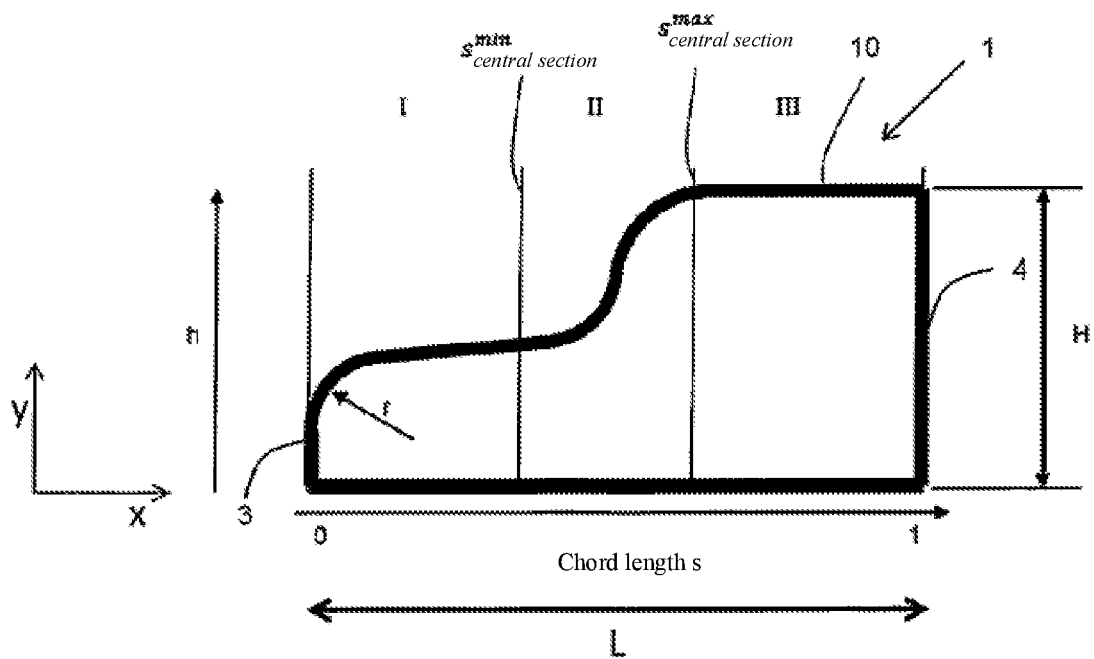
FIG. 1 is a lateral cross-sectional view of a blade of an air-conveying wheel.

Identical reference numerals designate identical parts in all the views.

FIG. 1 represents an embodiment example of a blade 1 of an air-conveying wheel 2 with a blade edge 10. The blade edge 10 includes an axial-side blade edge contour extending from the blade leading edge 3 to the blade trailing edge 4 along a curve subdivided into three sections. In the radial direction, when viewed along the chord length s, the front section I adjoins the blade leading edge 3 and transitions directly into the central section II. The rear section III directly adjoins the central section II, wherein the rear section III ends with the blade trailing edge 4.

The front section I has a curve progression with a rounding r at the transition from the axial extent into the radial extent of the blade edge contour. In the represented design, the rounding r corresponds to a value of r=5, H=16.5. H is the axial maximum height of the blade 1. The blade edge contour in the front section I corresponds to a horizontal parabola. The axial height h of the blade 1 increases in the direction of the adjoining central section. Over a section of more than 50% of the radial extent, the blade edge contour has a continuous curve progression in the front section I.

In the central section II, radially adjoining along the chord length, the blade edge contour has an elongated or flattened S-shaped curve progression. Thus, the axial height h of the blade 1 at first increases slightly in the direction of the blade trailing edge 4. At the start of the S shape, the axial height h increases considerably and then levels off flat in a direction of the rear section III. The curve progression in the central section II corresponds to a hyperbolic tangent, as described in greater detail below.

In the rear section, the curve of the blade edge contour extends continuously over the entire radial chord length and substantially without slope to the blade trailing edge 4. The curve of the blade edge contour of the blade edge 10 is in each case continuously differentiable at the respective adjoining points of the front section I and central section II and of the rear section III and the central section II, and consequently without jumps. Both the blade leading edge 3 and also the blade trailing edge 4 extend axially in a straight line.

The curve progression of the blade edge contour is defined in the non-rounded area in the front section I by the equation $$h(s) = (a \times s) + d$$

wherein, in the represented design:
front section:
a=0 and d=6/16.5
The curve progression of the blade edge contour is defined in the rear section III by the equation $$h(s) = a \times (s - s_{central\ section}^{max}) + d$$

wherein, in the represented design:
rear section:
a=0 and d=1
Thus, $$S = \frac{x}{L}$$

where $x \in [0, L]$ and $$h = \frac{y}{H}$$

where $y \in [0, H]$, where $L=24$ and $H=16.5$.

The curve progression of the blade edge contour is defined in the central section II by the equation $$h(s) = \tanh\left(\frac{s - \left(\frac{s_{central\ section}^{min} + s_{central\ section}^{max}}{2}\right)}{t}\right) * \frac{h(s_{central\ section}^{min}) + h(s_{central\ section}^{max})}{2} + h(s_{central\ section}^{min}) + \frac{h(s_{central\ section}^{min}) + h(s_{central\ section}^{max})}{2}$$

wherein, in the design represented:

$$s_{central\ section}^{min} = 0.3$$

$$s_{central\ section}^{max} = 0.7$$

$$h(s_{central\ section}^{min}) = \frac{6}{16.5}$$

$$h(s_{central\ section}^{max}) = 1$$

$$t = \frac{tdesign}{L}$$

with
$tdesign \in [0, L]$

Figure 2:
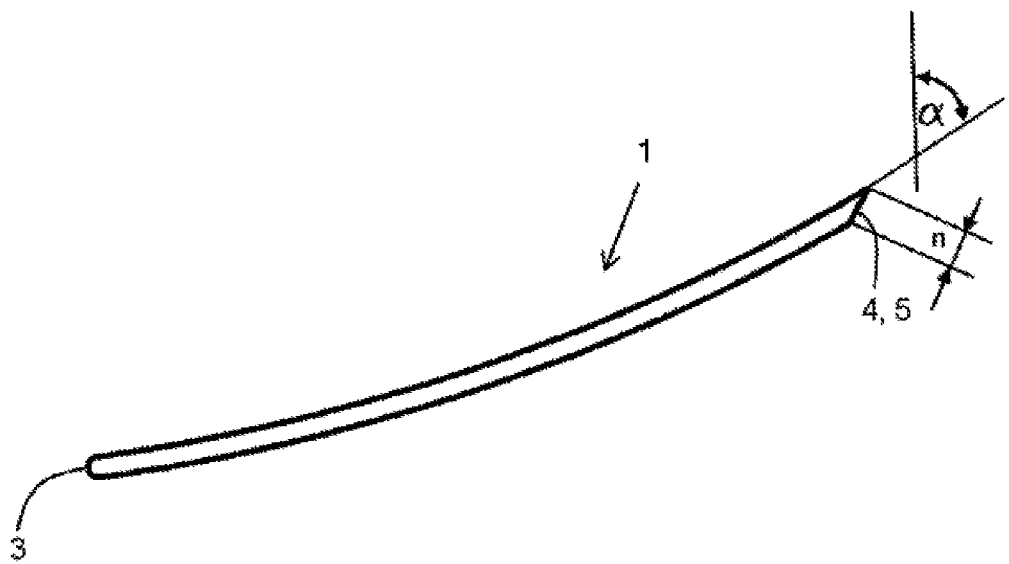
FIG. 2 is a top plan view onto the blade according to FIG. 1.

FIG. 2 shows a cross-sectional view of the blade 1 from FIG. 1 in a top view. The blade 1 extends in the shape of an arc from the blade leading edge 3 to the blade trailing edge 4. The blade leading edge 3 is rounded. The blade trailing edge 4 has the inclination 5 with respect to the radial extent of the blade 1 at an angle $\alpha=60°$. In the design shown, the width n of the blade 1 along the inclination 5 in projection corresponds to approximately 5% of the chord length s. In conventional external rotor motors for fans, the value for n is preferably between 2 and 15 mm.

Figure 3:
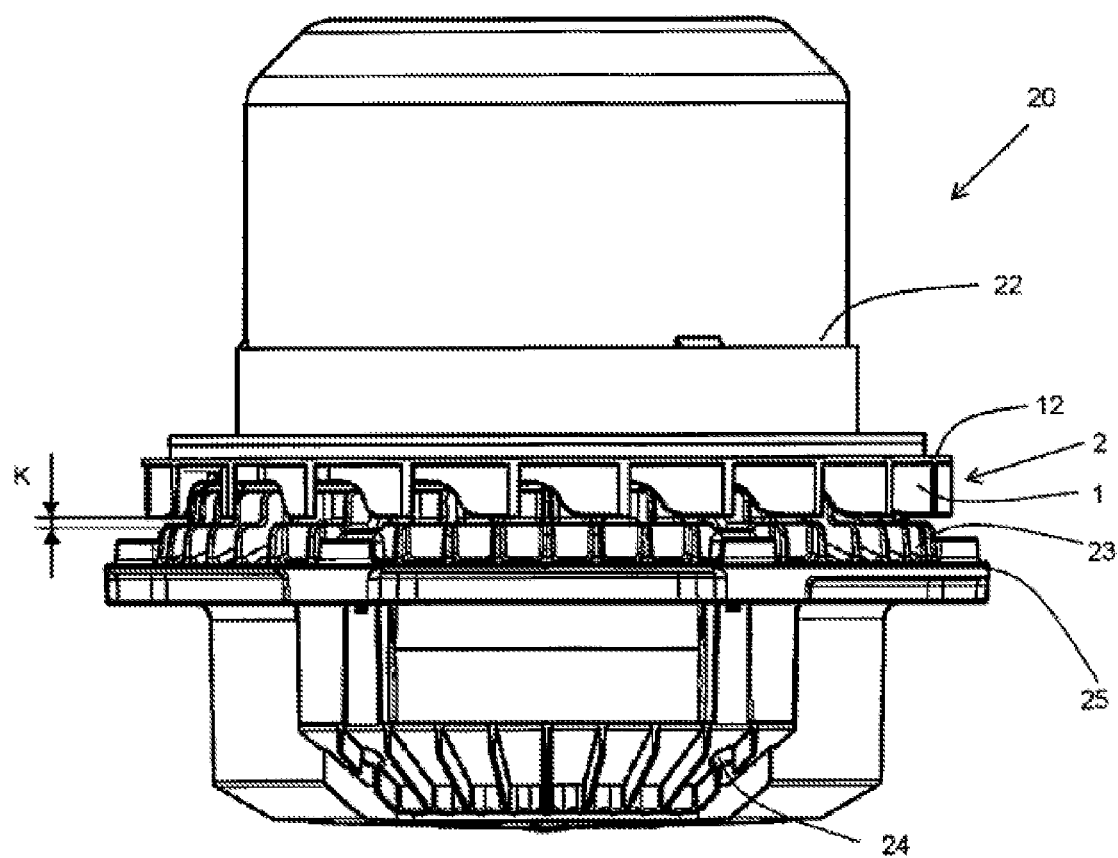
FIG. 3 is a side view onto an external rotor motor with integrated air-conveying wheel with a blade geometry according to FIG. 1.

In FIG. 3, an installation position of an air-conveying wheel 2 with a blade geometry of a blade 1 according to FIG. 1 in an external rotor motor 20 is shown. The air-conveying wheel 2 has a bottom plate 12, but, along the blade edges 10, it is open to inflow in the axial direction. It is without a cover plate and completely uncovered. The external rotor motor 20 comprises a stator bushing 25, a plurality of stator bushing cooling ribs 23 as well as a rotor 22. The bushing cooling ribs 23 are arranged in each case spaced apart from one another in a peripheral direction and extend in the axial direction. Additional components of the external rotor motor 20 correspond, for example, to the components of the prior art cited at the beginning. In the stator bushing 25, a suctioning opening 24 is provided, via which the air-conveying wheel 2, in operation, suctions and radially blows out the cooling air stream. The suctioned air flows along the heated components such as the electronics housing and the stator bushing and dissipates the heat. The axially free blade edges 10 directly face the stator bushing cooling ribs 23 which are also axially free. They are spaced via the head gap K whose size in the design shown is determined by $K=0.15\ H$. The blade edges 10, with regard to the axial extent, have a complementary shape relative to the stator bushing cooling ribs 23, so that the head gap K is constant over the chord length s.

The disclosure, in terms of its design, is not limited to the above-indicated preferred embodiment examples. Instead, a number of variants are conceivable, which make use of the represented solution even in designs of fundamentally different type. For example, the blade leading edge as well as the blade trailing edge can also extend at an inclination in the axial direction.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A blade edge of at least one blade of an air-conveying wheel with an axial-side blade edge contour that extends from a blade leading edge to a blade trailing edge along a curve, the blade edge contour has at least one front section (I) that adjoins the blade leading edge in the radial direction, a rear section (III) that adjoins the blade trailing edge in the radial direction, and a central section (II) that lies between the front section (I) and the rear section (III), the blade edge contour has an S-shaped curve progression in the central section (II) in a lateral cross-sectional view, this increasing an axial height h of the blade in the direction of the blade trailing edge, the central section (II) has a curve progression along a chord length s of the blade from a beginning of the central section $s_{central\ section}^{min}$ to an end of the central section $s_{central\ section}^{max}$, that is determined normalized by the formula $$h(s) = \tanh\left(\frac{s - \left(\frac{s_{central\ section}^{min} + s_{central\ section}^{max}}{2}\right)}{t}\right) * \frac{h(s_{central\ section}^{min}) + h(s_{central\ section}^{max})}{2} + h(s_{central\ section}^{min}) + \frac{h(s_{central\ section}^{min}) + h(s_{central\ section}^{max})}{2}$$

wherein h corresponds to an axial height of the blade and s to a chord length of the blade, that extends from the blade leading edge to the blade trailing edge, wherein h and s in each case have values of 0 to 1,
and $t \in [0, 1]$, $0.1 \leq s_{central\ section}^{min} \leq s_{central\ section}^{max}$, $s_{central\ section}^{min} \leq s_{central\ section}^{max} \leq 0.8$.

2. The blade edge according to claim 1, wherein the S-shaped curve progression corresponds to a curve of a hyperbolic tangent.

3. The blade edge according to claim 1, wherein the blade edge contour has a continuous curve progression in the front section (I) and in the rear section (III) at least in sections.

4. The blade edge according to claim 3, wherein the blade edge contour has a continuous curve progression in the front section (I) and in the rear section (III) over 50-100% of the radial length thereof.

5. The blade edge according to claim 1, wherein the front section (I) and the rear section (III) directly adjoin the central section (II).

6. The blade edge according to claim 5, wherein the curve of the blade edge contour is, in each case, continuously differentiable on both sides at the respective adjoining points of the front section (I) and the central section (II) as well as of the rear section (III) and the central section (II).

7. The blade edge according to claim 1, wherein the front section (I) has a curve progression along a chord length s of the blade that is determined normalized by the formula $$h(s) = a \times s + d$$

where h corresponds to an axial height of the blade and s corresponds to a chord length of the blade, which extends from the blade leading edge (3) to the blade trailing edge (4) from the value 0 to 1, and:

$$s \in [0, s_{central\ section}^{min}] \text{ and}$$

$$-0.5 \leq a \leq 1,$$

$$0 < d \leq 1,$$

$$a + d \leq 1.$$

8. The blade edge according to claim 1, wherein the rear section (III) has a curve progression along a chord length s of the blade, which is determined normalized by the formula $$h(s) = a \times (s - s_{central\ section}^{max}) + d$$

where h corresponds to an axial height of the blade and s corresponds to a chord length of the blade, which extends from the blade leading edge to the blade trailing edge from the value 0 to 1, and:

$$s \in [0, s_{central\ section}^{max}, 1] \text{ and}$$

$$-0.5 \leq a \leq 1,$$

$$0 < d \leq 1,$$

$$a + d \leq 1,$$

9. The blade edge according to claim 1, wherein the front section (I) has a curve progression in a transition from an axial extent to a radial extent having a rounding r, that is determined by $0 \leq r \leq H$, where H corresponds to the axial maximum height of the blade.

10. The blade edge according to claim 1, wherein in an axial top view onto the blade, the blade trailing edge has a bevel with respect to a radial extent of the blade at an angle α, where $5° < \alpha < 70°$.

11. An air-conveying wheel with at least one blade with a blade edge according to claim 1, wherein the blade edge is open to inflow, i.e., uncovered.

12. A use of an air-conveying wheel according to claim 11, wherein the installation position in an electric motor occurs in such a manner that a thin head gap (K) adjoining the blade edge in an axial direction relative to an axially adjoining component of the electric motor is in a range from $0.02\ H < K < 0.4\ H$, wherein H corresponds to the maximum height of the blade.

* * * * *